United States Patent
Osakabe et al.

(10) Patent No.: US 9,277,070 B2
(45) Date of Patent: *Mar. 1, 2016

(54) IMAGE SCANNING DEVICE

(71) Applicant: Brother Kogyo Kabushiki Kaisha, Nagoya-shi, Aichi-ken (JP)

(72) Inventors: Yoshinori Osakabe, Seto (JP); Katsuro Miura, Toyota (JP); Muneaki Takahata, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 113 days.

This patent is subject to a terminal disclaimer.

(21) Appl. No.: 13/755,235

(22) Filed: Jan. 31, 2013

(65) Prior Publication Data

US 2013/0235436 A1 Sep. 12, 2013

Related U.S. Application Data

(63) Continuation-in-part of application No. 13/417,383, filed on Mar. 12, 2012.

(30) Foreign Application Priority Data

Mar. 30, 2012 (JP) ................................. 2012-081323

(51) Int. Cl.
*G06K 15/00* (2006.01)
*H04N 1/00* (2006.01)

(52) U.S. Cl.
CPC ....... *H04N 1/00522* (2013.01); *H04N 1/00519* (2013.01)

(58) Field of Classification Search
None
See application file for complete search history.

(56) References Cited

U.S. PATENT DOCUMENTS

| | | | |
|---|---|---|---|
| 5,755,435 | A | 5/1998 | Fujiwara |
| 6,027,108 | A | 2/2000 | Johdai et al. |
| 6,126,163 | A | 10/2000 | Katsuta et al. |
| 6,321,064 | B1 | 11/2001 | Mizubata et al. |
| 6,612,561 | B2 | 9/2003 | Sekine |

(Continued)

FOREIGN PATENT DOCUMENTS

| | | | |
|---|---|---|---|
| JP | 61-124467 A | 6/1986 | |
| JP | 61-269140 A | 11/1986 | |

(Continued)

OTHER PUBLICATIONS

JP Notice of Reasons for Rejection mailed Jan. 14, 2014, JP App. 2011-218078, English translation.

(Continued)

*Primary Examiner* — John Wallace
(74) *Attorney, Agent, or Firm* — Banner & Witcoff, Ltd.

(57) ABSTRACT

An image scanning device includes a housing, a scanning unit disposed inside the housing and configured to scan, at a scanning position, an image of a sheet, a conveying mechanism disposed inside the housing, and a cover. The conveying mechanism is configured to convey the sheet along a common path to the scanning position in a first direction, and to discharge the sheet having passed the scanning position selectively along a return path in a second direction and along a one-way path in the first direction. The cover is configured to receive the sheet discharged from the one-way path in an inclined position in which the cover extends upward from the one-way path and is inclined relative to the one-way path.

10 Claims, 14 Drawing Sheets

(56) References Cited

U.S. PATENT DOCUMENTS

| | | |
|---|---|---|
| 6,882,822 B2 | 4/2005 | Gomi et al. |
| 7,016,090 B2 | 3/2006 | Sekine |
| 7,595,903 B2 | 9/2009 | Kizaki et al. |
| 7,637,502 B2 | 12/2009 | Ata et al. |
| 7,726,650 B2 | 6/2010 | Tu |
| 7,731,779 B2 | 6/2010 | Palumbo |
| 7,826,105 B2 | 11/2010 | Yamaguchi |
| 7,883,285 B2 | 2/2011 | Asada et al. |
| 7,941,068 B2 | 5/2011 | Kimura |
| 7,976,020 B2 | 7/2011 | Awai |
| 8,020,853 B2 | 9/2011 | Shiraki et al. |
| 8,104,765 B2 | 1/2012 | Tsuchiya et al. |
| 8,109,498 B2 | 2/2012 | Akimatsu |
| 8,172,225 B2 | 5/2012 | Tanahashi |
| 8,177,219 B2 | 5/2012 | Chen et al. |
| 8,235,385 B2 | 8/2012 | Shimizu |
| 8,336,877 B2 | 12/2012 | Yamamoto et al. |
| 8,493,639 B2 | 7/2013 | Samoto et al. |
| 8,764,005 B2 | 7/2014 | Tajima |
| 2002/0056957 A1 | 5/2002 | Sekine |
| 2003/0202218 A1 | 10/2003 | Morinaga et al. |
| 2004/0184824 A1 | 9/2004 | Hirai et al. |
| 2005/0140086 A1* | 6/2005 | Ono et al. ............... 271/207 |
| 2005/0212195 A1 | 9/2005 | Ohama et al. |
| 2008/0175627 A1 | 7/2008 | Sato |
| 2008/0240823 A1 | 10/2008 | Asada |
| 2009/0027744 A1 | 1/2009 | Kim |
| 2009/0072466 A1 | 3/2009 | Shishikura |
| 2009/0295082 A1 | 12/2009 | Awai |
| 2009/0302520 A1 | 12/2009 | Shimmachi et al. |
| 2009/0315253 A1* | 12/2009 | Osakabe et al. ............ 271/121 |
| 2010/0074640 A1* | 3/2010 | Okano .................. 399/45 |
| 2011/0199654 A1 | 8/2011 | Takata |
| 2011/0273753 A1 | 11/2011 | Yonemura et al. |
| 2012/0013930 A1 | 1/2012 | Kondo |
| 2013/0083336 A1 | 4/2013 | Miura et al. |
| 2013/0083376 A1 | 4/2013 | Miura et al. |
| 2013/0187330 A1 | 7/2013 | Kuroda et al. |
| 2013/0235433 A1 | 9/2013 | Osakabe et al. |
| 2013/0272770 A1 | 10/2013 | Asada et al. |
| 2013/0293930 A1 | 11/2013 | Araki et al. |

FOREIGN PATENT DOCUMENTS

| | | |
|---|---|---|
| JP | 2-291352 A | 12/1990 |
| JP | H06-156846 A | 6/1994 |
| JP | 08-067395 A | 3/1996 |
| JP | 8-133553 A | 5/1996 |
| JP | H09-80836 A | 3/1997 |
| JP | 2821011 B2 | 11/1998 |
| JP | 11-127301 A | 5/1999 |
| JP | 2000-026003 A | 1/2000 |
| JP | 2000-165594 A | 6/2000 |
| JP | 2001-019255 A | 1/2001 |
| JP | 2002-012354 A | 1/2002 |
| JP | 2003-270734 A | 9/2003 |
| JP | 3485651 B2 | 1/2004 |
| JP | 3750643 B2 | 3/2006 |
| JP | 3855475 B2 | 12/2006 |
| JP | 3907852 B2 | 4/2007 |
| JP | 2007-302402 A | 11/2007 |
| JP | 2010-006608 A | 1/2010 |
| JP | 2010-017998 A | 1/2010 |
| JP | 4447764 B2 | 4/2010 |
| JP | 2011-171957 A | 9/2011 |
| JP | 2013-052929 A | 3/2013 |
| JP | 2013-078070 A | 4/2013 |

OTHER PUBLICATIONS

Non-Final Office Action received in corresponding U.S. Appl. No. 13/755,259 mailed May 22, 2014.
Final Office Action received in corresponding U.S. Appl. No. 13/417,383 mailed Jun. 6, 2014.
Non-final Office Action received in U.S. Appl. No. 13/417,395 mailed Aug. 15, 2013.
Notice of Allowance issued in U.S. Appl. No. 13/417,395 mailed Nov. 12, 2013.
JP Office Action mailed Oct. 15, 2013, JP Appln. 2011-218079, English translation.
Co-pending U.S. Appl. No. 13/417,395, filed Mar. 12, 2012.
Non-Final Office Action issued in corresponding U.S. Appl. No. 13/417,383 mailed Dec. 20, 2013.
Sep. 3, 2014—(US) Non-Final Office Action—U.S. Appl. No. 14/203,627.
Jul. 22, 2014—(JP) Notice of Reasons for Rejection—App 2012-081324—Eng Tran.
Nov. 14, 2014—(US) Notice of Allowance—U.S. Appl. No. 14/203,627.
Nov. 17, 2014—(US) Non-Final Office Action—U.S. Appl. No. 13/417,383.
Oct. 2, 2014—(US) Notice of Allowance and Fee(s) Due—U.S. Appl. No. 13/755,259.

* cited by examiner

IMAGE SCANNING DEVICE

CROSS REFERENCE TO RELATED APPLICATION

This is a Continuation-In-Part application of U.S. patent application Ser. No. 13/417,383 filed on Mar. 12, 2012 entitled "IMAGE SCANNING DEVICE," the entire disclosure of which is incorporated herein by reference. This application also claims priority from Japanese Patent Application No. 2012-081323, filed on Mar. 30, 2012, the entire disclosure of which is incorporated herein by reference.

BACKGROUND OF THE INVENTION

1. Field of the Invention

The present invention relates to an image scanning device configured to scan an image of a sheet.

2. Description of Related Art

A known image scanning device comprises a conveying unit configured to convey a sheet to an image scanning unit. The image scanning unit scans an image formed on the sheet when the sheet passes by the image scanning unit.

In the known image scanning device, a sheet is conveyed along a common path to the scanning unit, and the sheet having passed the scanning unit is discharged selectively along a first path onto a first discharge portion and along a second path onto a second discharge portion. The first discharge portion and the second discharge portion are disposed on a top surface and a side surface of the housing of the image scanning device, respectively. The sheet conveyed from the common path is discharged along the second path in a direction substantially parallel to the common path, and the second discharge portion extends from the side surface of the housing in a direction substantially parallel to the common path and at a relatively large angle relative to the side surface. Such a structure may increase the area occupied by the image scanning device.

SUMMARY OF THE INVENTION

Therefore, a need has arisen for an image scanning device that overcomes this and other shortcomings of the related art and is configured to selectively discharge a sheet having passed a scanning unit to a plurality of discharge portions without increasing the area occupied by the image scanning device.

According to an embodiment of the invention, an image scanning device comprises a housing, a scanning unit disposed inside the housing and configured to scan, at a scanning position, an image of a sheet, a conveying unit, and a cover. The conveying mechanism is disposed inside the housing and is configured to convey the sheet along a common path to the scanning position in a first direction, and to discharge the sheet having passed the scanning position selectively along a return path in a second direction and along a one-way path in the first direction. The cover is configured to receive the sheet discharged from the one-way path in an inclined position in which the cover extends upward from the one-way path and is inclined relative to the one-way path.

According to another embodiment of the invention, an image scanning device comprises a housing, a scanning unit disposed inside the housing and configured to scan, at a scanning position, an image of a sheet, a conveying unit, and a receiving member. The conveying mechanism is disposed inside the housing and is configured to convey the sheet along a common path to the scanning position in a first direction, and to discharge the sheet having passed the scanning position selectively along a return path in a second direction and along a one-way path in the first direction. The receiving member extends upward from the one-way path and is configured to receive the sheet discharged from the one-way path. An angle of inclination of the one-way path relative to a reference surface perpendicular to a vertical direction differs from an angle of inclination of the receiving member relative to the reference surface.

According to another embodiment of the invention, an image scanning device comprises a housing, a scanning unit disposed inside the housing and configured to scan, at a scanning position, an image of a sheet, a conveying unit, a one-way path, and a receiving member. The conveying mechanism is disposed inside the housing and is configured to convey the sheet along a common path to the scanning position in a first direction, and to discharge the sheet having passed the scanning position selectively along a return path in a second direction and along a one-way path in the first direction. The one-way path is inclined upward relative to the common path. The receiving member extends upward from the one-way path and configured to receive the sheet discharged along the one-way path.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

DETAILED DESCRIPTION OF EMBODIMENTS

Embodiments of the invention and their features and technical advantages may be understood by referring to FIGS. 1-14, like numerals being used for like corresponding parts in the various drawings.

Figure 1:
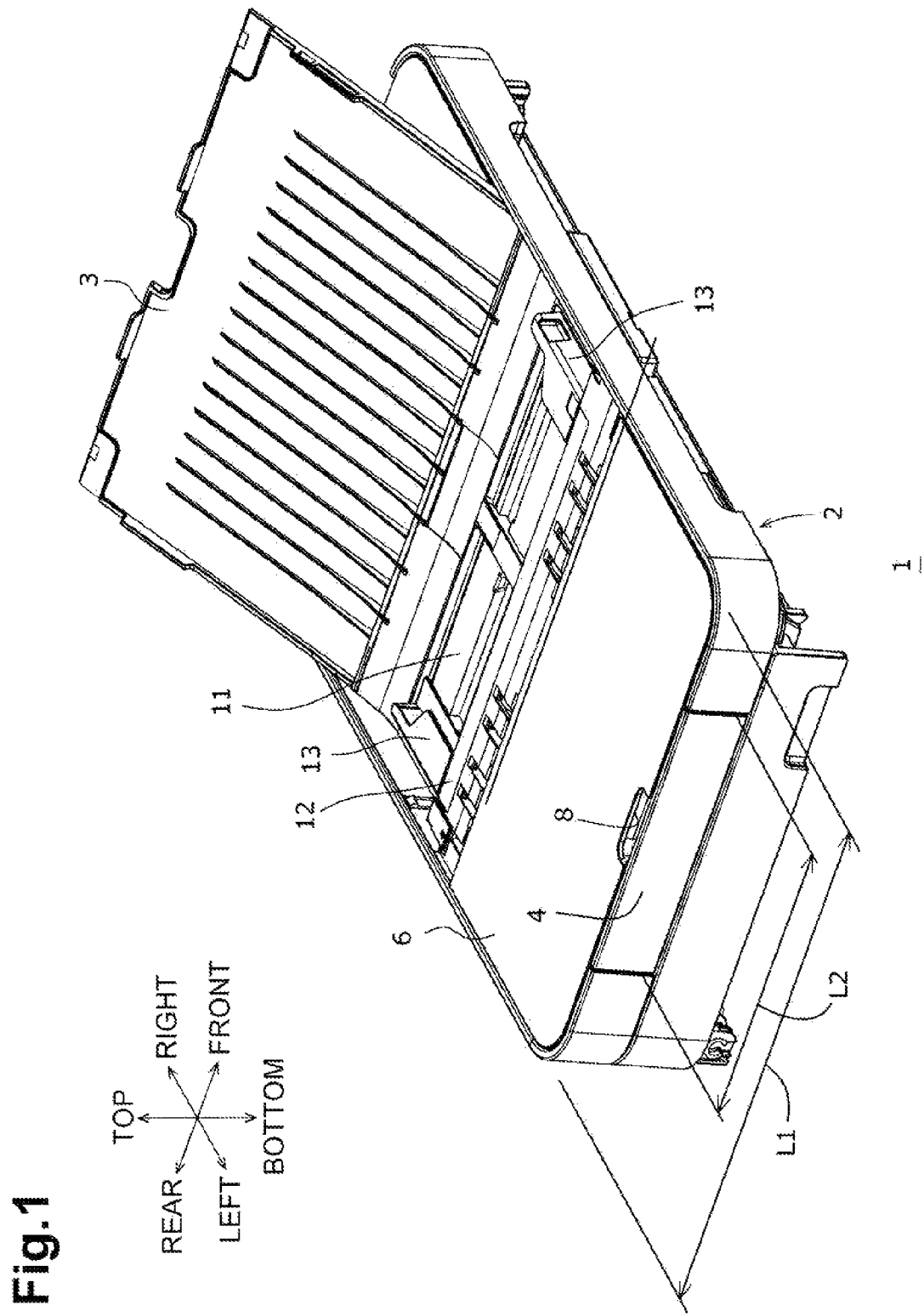
FIG. 1 is a perspective view of an image scanning device with a tray in a use position, as viewed from the front left top.

As shown in FIG. 1 an image scanning device 1 has a substantially rectangular shape in the plan view. For example, the image scanning device 1 may be mounted on a printer (not shown) and constitute together with the printer a multi-function device which is compact in size.

The lengthwise direction of the image scanning device 1 in the plan view is defined as a left-right direction, and a direction perpendicular to the lengthwise direction is defined as a front-rear direction. A direction perpendicular to the left-right direction and the front-rear direction when the multi-function device is placed on a horizontal surface is defined as a top-bottom direction. In each of FIGS. 1-14, the directions thus defined are shown by arrows for better understanding of the figures. Hereinafter, a direction from the right to the left is an example of a first direction. In this case, the right side is upstream in the first direction, and the left side is downstream in the first direction.

The image scanning device comprises a housing 2.

Figure 2:
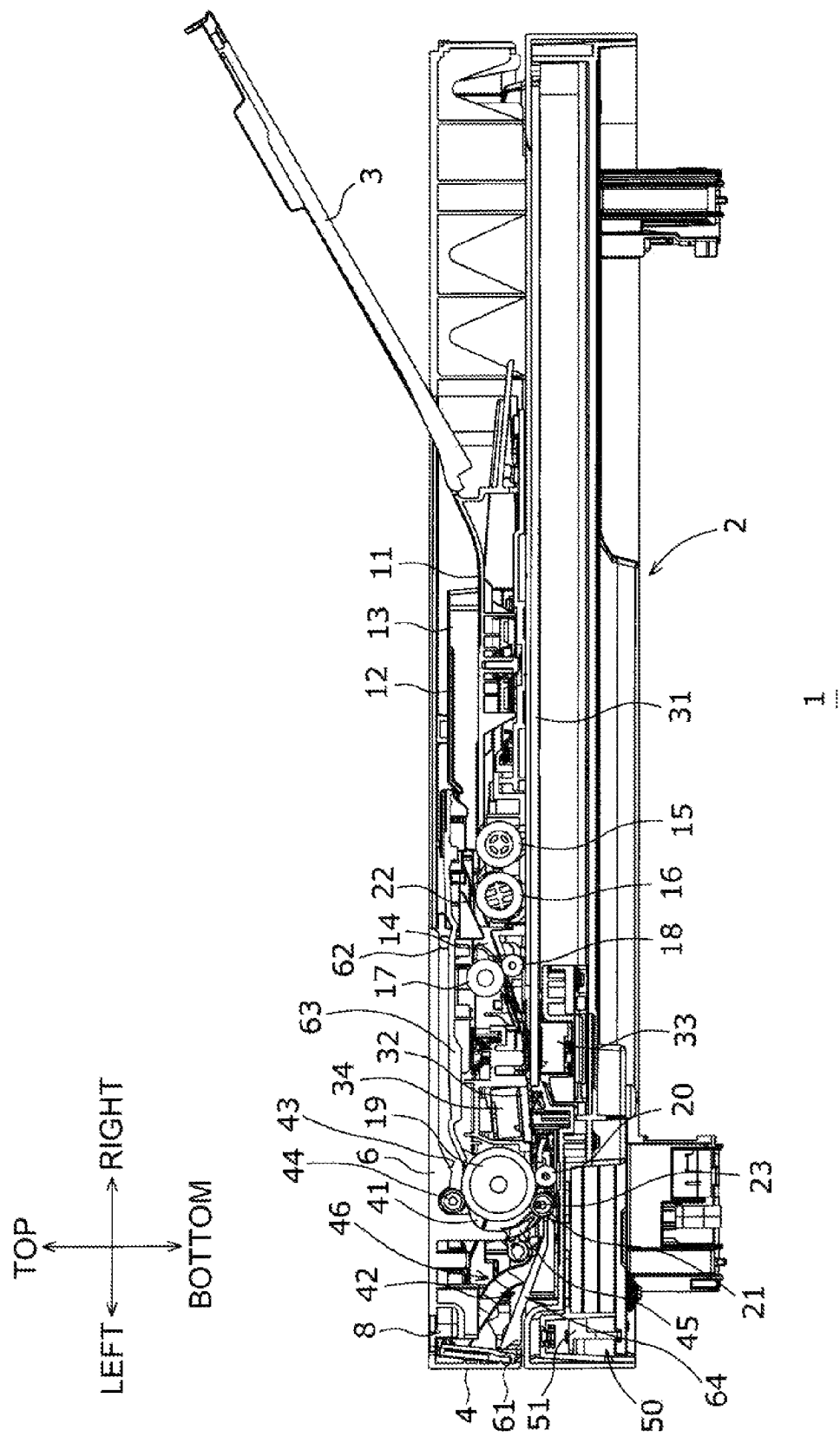
FIG. 2 is a cross-sectional view of the image scanning device of FIG. 1.

A tray 3 is attached to the housing 2. The tray 3 is movable between a non-use position and a use position. An outer surface of the tray 3 in the non-use position forms a central portion of an upper surface of the housing 2 in the left-right direction. In order to move the tray 3 from the non-use position to the use position, a left end of the tray 3 in the non-use position is raised, and the tray 3 is pivoted rightward about its right end. As shown in FIGS. 1 and 2, the tray 3 in the use position extends obliquely upward and rightward.

A discharge cover 4, which is an example of a cover and a receiving member, is disposed on a left side surface of the housing 2. The discharge cover 4 is opened and closed by being pivoted about a pivot shaft 61 which extends in the front-rear direction. The discharge cover 4 has a substantially rectangular shape having a width in the front-rear direction shorter than the left side surface of the housing 2.

Figure 3:
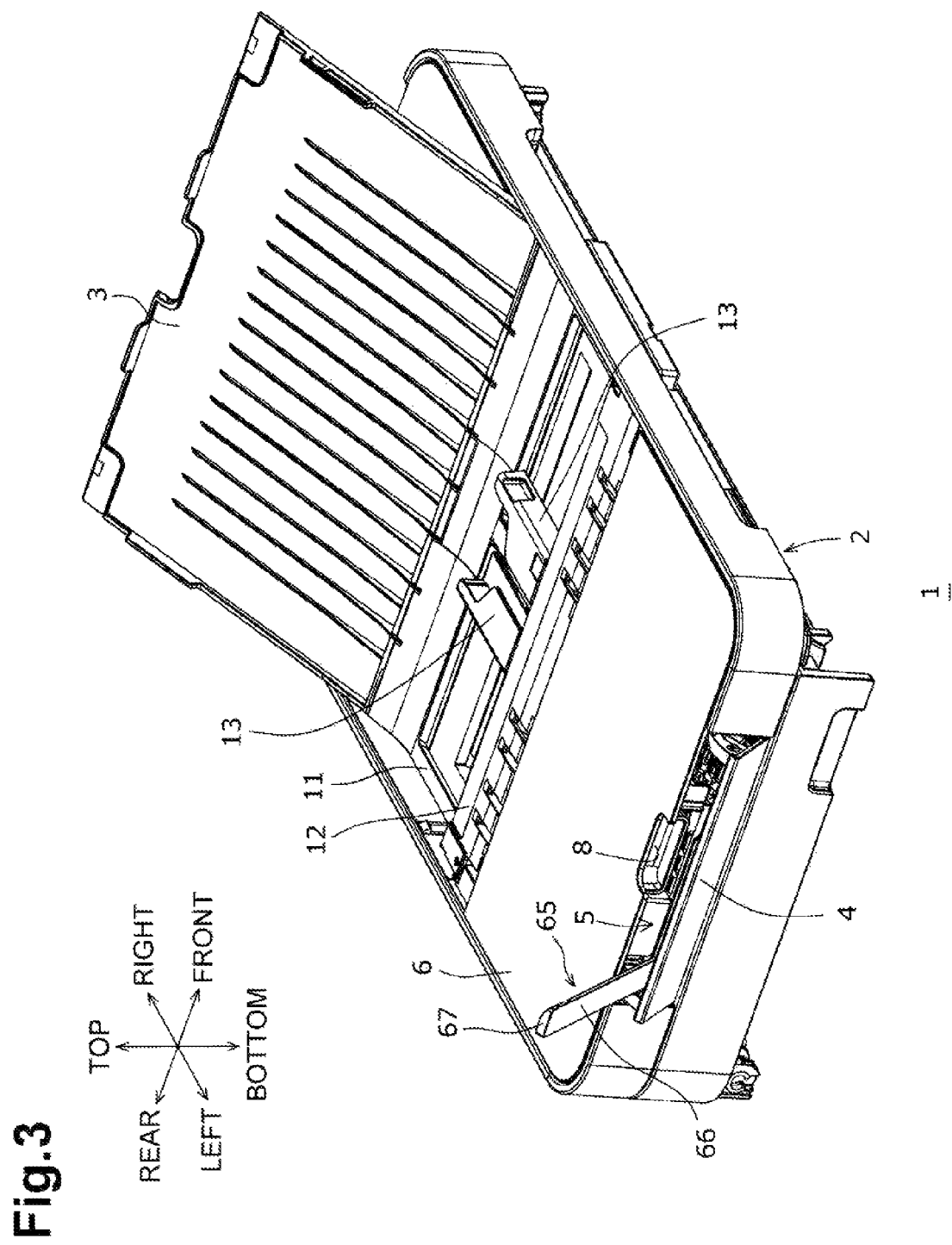
FIG. 3 is a perspective view of the image scanning device with a discharge cover open, as viewed from the front left top.
Figure 4:
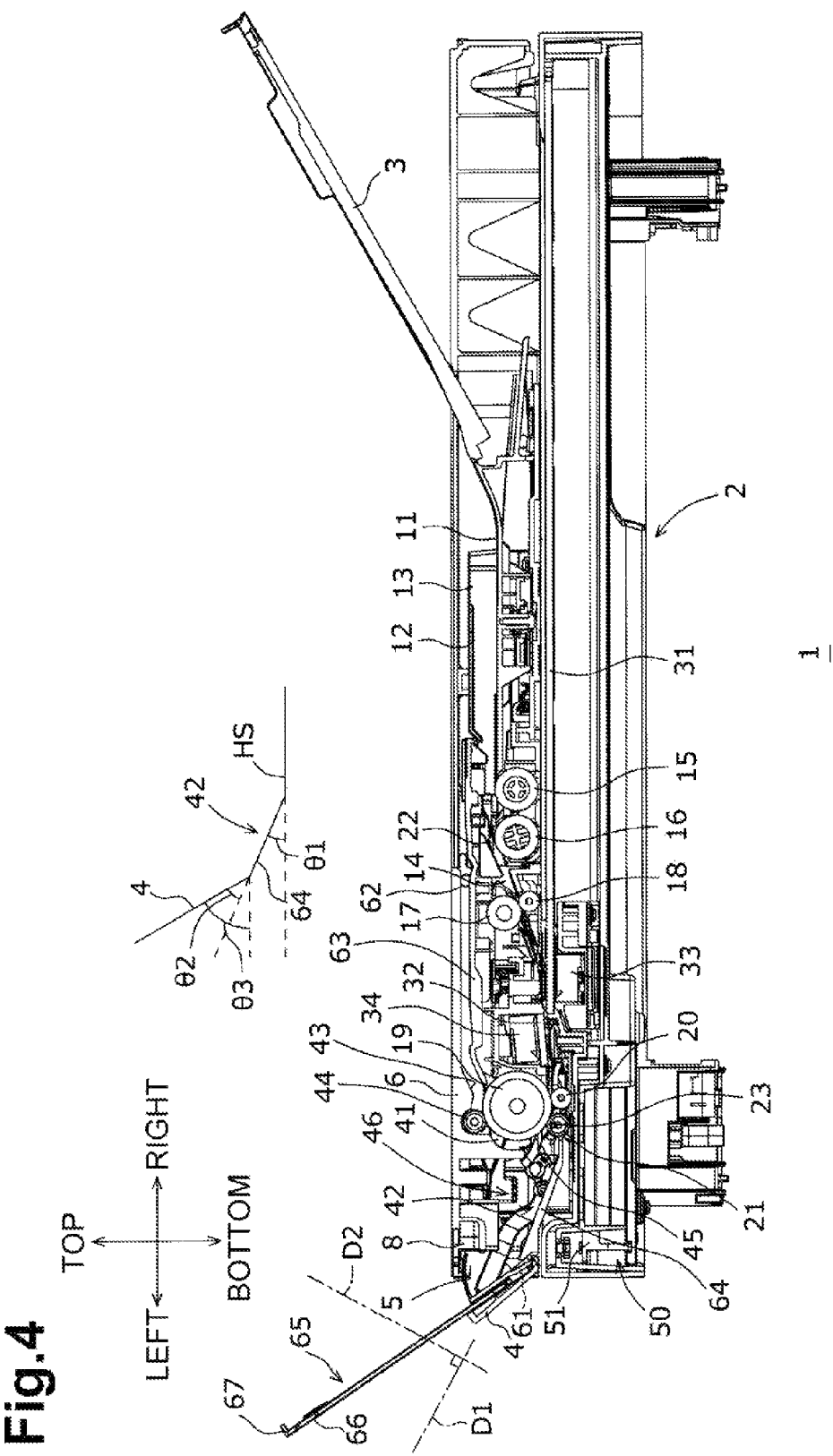
FIG. 4 is a cross-sectional view of the image scanning device of FIG. 3.

The pivot shaft 61 extends along a lower edge of the discharge cover 4. As shown in FIGS. 1 and 2, when the discharge cover 4 is closed, an outer surface of the discharge cover 4 forms a central portion of the left side surface of the housing 2 in the front-rear direction. As shown in FIGS. 3 and 4, when the discharge cover 4 is open, the discharge cover 4 extends obliquely upward and leftward at an angle θ3 of approximately 50 degrees relative to a horizontal surface HS. In this state, as shown in FIG. 4, the discharge cover 4 extends from a one-way path 42 (to be described later) and is inclined relative to the one-way path 42 in a direction between a direction D1 parallel to a one-way path 42 and a direction D2 perpendicular to the one-way path 42. The discharge tray 4 which is open and the housing 2 define a discharge port 5.

A maintenance cover 6 is disposed at a left end portion of the upper surface of the housing 2. The maintenance cover 6 is opened and closed by being pivoted about a pivot shaft 62 which extends in the front-rear direction. The maintenance cover 6 has a substantially rectangular plate shape having a length L1 in the front-rear direction which is substantially equal to a length in the front-rear direction of the upper surface of the housing 2. The length L1 of the maintenance cover 6 is greater than a length L2 in the front-rear direction of the discharge cover 4. The length L2 is smaller than the left side surface of the housing 2.

Figure 5:
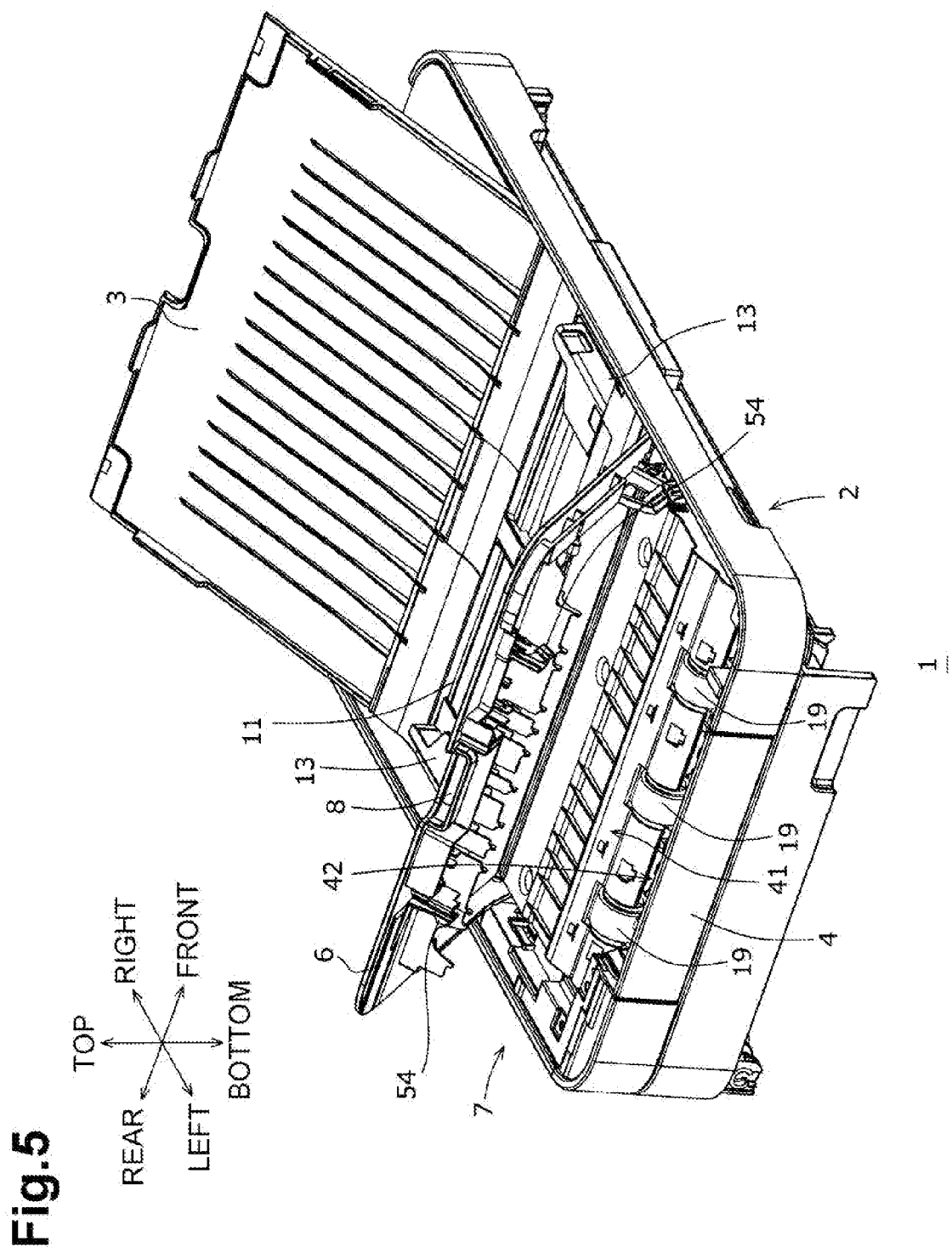
FIG. 5 is a perspective view of the image scanning device with a maintenance cover open, as viewed from the front left top.
Figure 6:
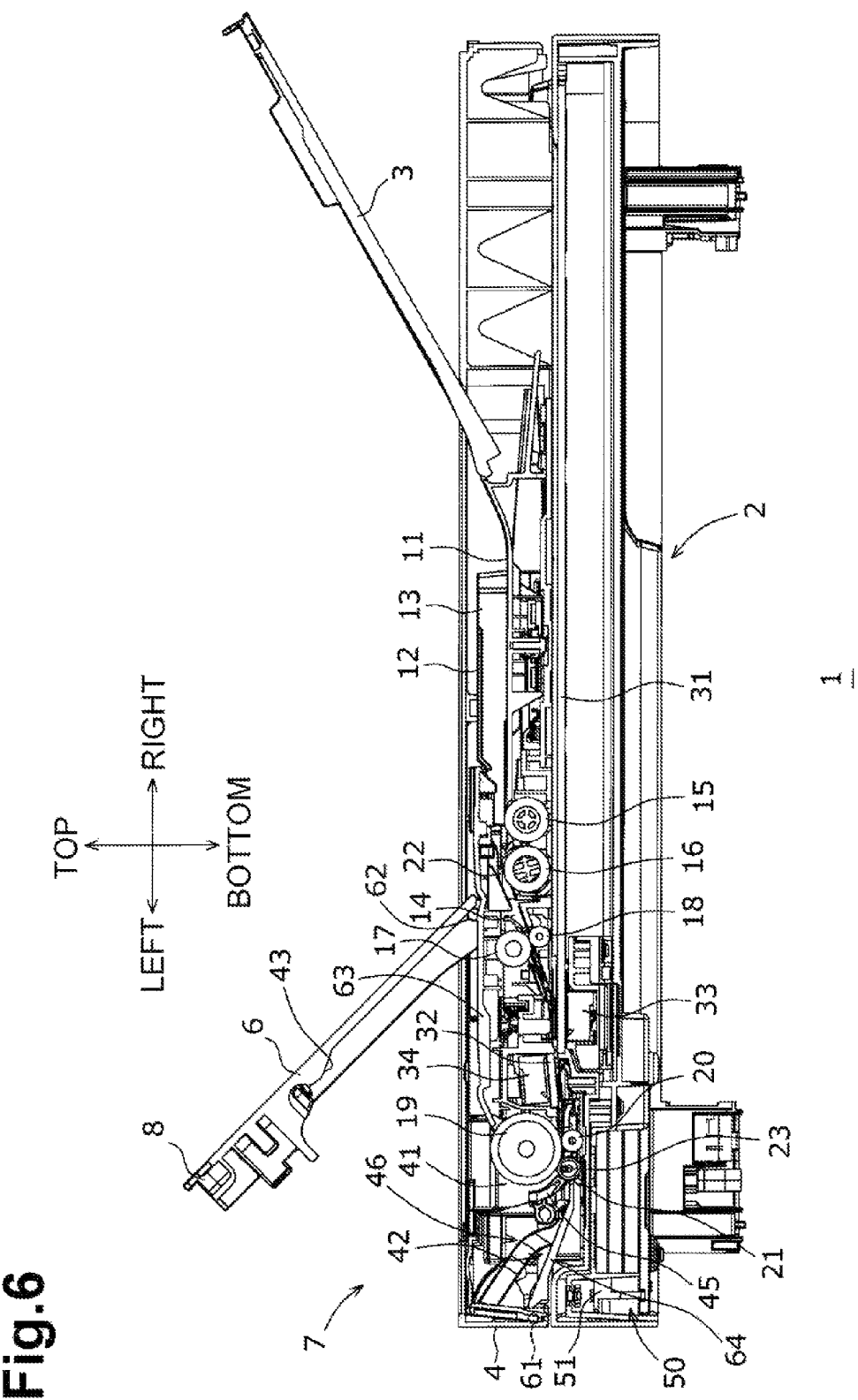
FIG. 6 is a cross-sectional view of the image scanning device of FIG. 5.

The pivot shaft 62 extends along a right edge of the maintenance cover 6. As shown in FIGS. 1 and 2, when the maintenance cover 6 is closed, an outer surface of the maintenance cover 6 forms the left end portion of the upper surface of the housing 2. As shown in FIGS. 5 and 6, the maintenance cover 6 which is open extends obliquely upward and leftward. In this state, the maintenance cover 6 and the housing 2 define a maintenance opening 7 through which a return path 41 (to be described later) and the one-way path 42 are exposed.

Figure 7:
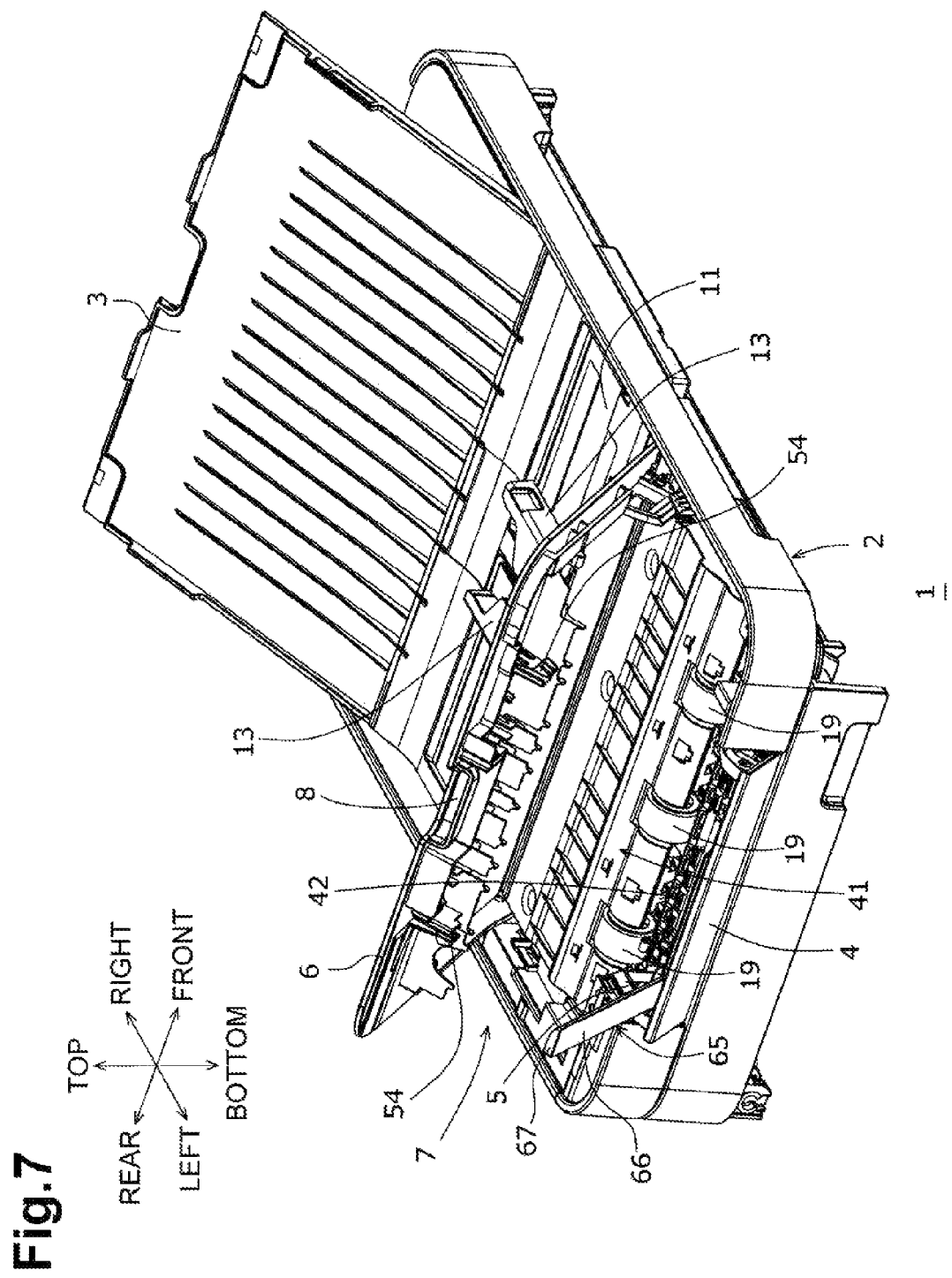
FIG. 7 is a perspective view of the image scanning device with a discharge cover and a maintenance cover open, as viewed from the front left top.
Figure 8:
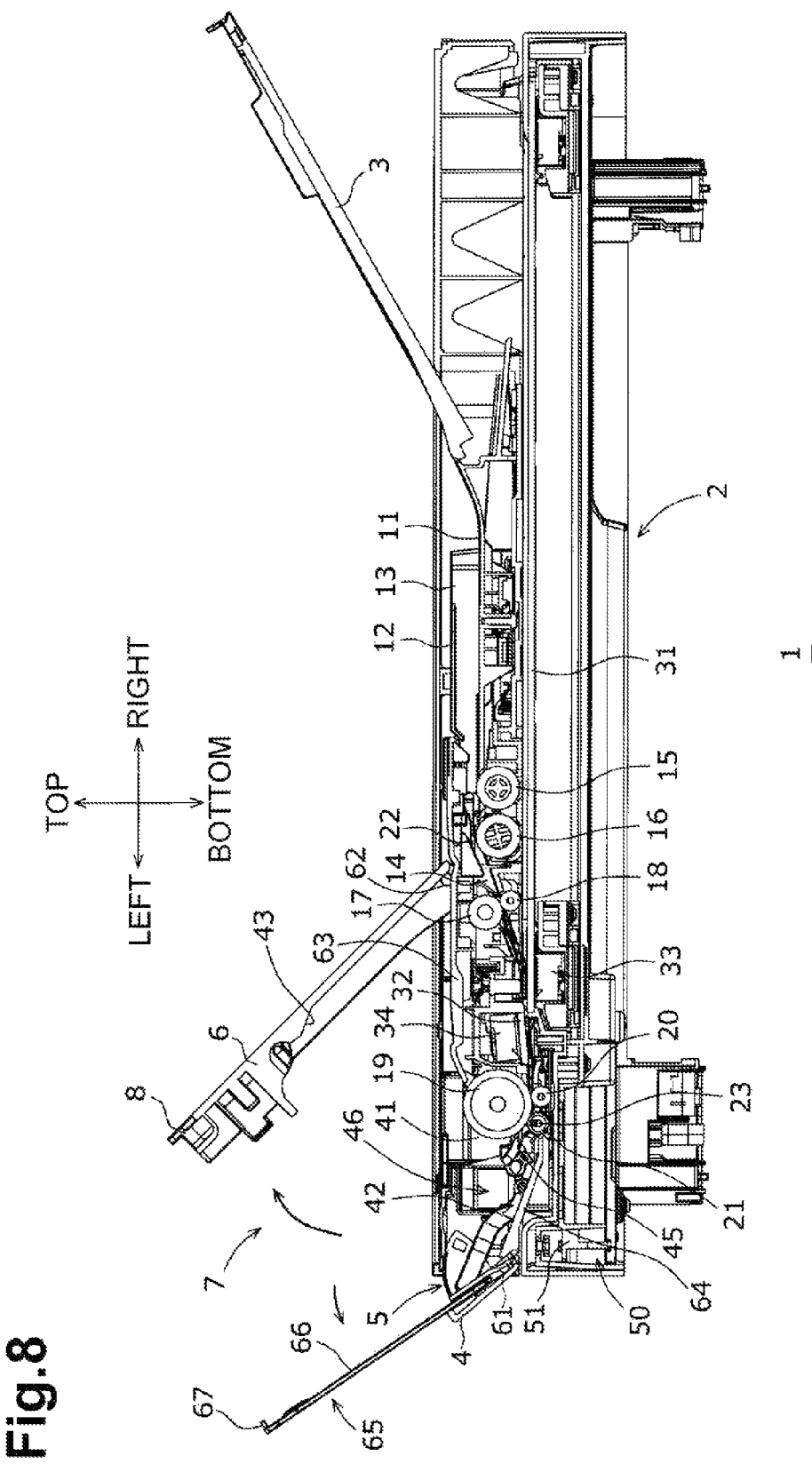
FIG. 8 is a cross-sectional view of the image scanning device of FIG. 7.

As shown in FIGS. 7 and 8, when the discharge cover 4 and the maintenance cover 6 are both open, the discharge port 5 and the maintenance opening 7 communicate with each other to define a larger opening through which the inside of the housing 2 is easily visible.

As shown in FIGS. 1 and 2, when the discharge cover 4 and the maintenance cover 6 are both closed, an upper edge of the discharge cover 4 and a left edge of the maintenance cover 6 butt against each other while leaving little clearance and extend in the front-rear direction.

A finger recess 8 is formed in a central portion in the front-rear direction of the left edge of the maintenance cover 6. The finger recess 8 is cut from the left edge of the maintenance cover 6 into a rectangular shape in the plan view. As shown in FIGS. 7 and 8, the finger recess 8 is recessed downward from an upper surface of the maintenance cover 6 and is open upward and leftward. The discharge cover 4 is opened by inserting a fingertip into the finger recess 8 and pushing the upper edge of the discharge cover 4 leftward when the discharge cover 4 and the maintenance cover 6 are both closed. The maintenance cover 6 is opened by inserting a fingertip into the finger recess 8 and lifting up the left edge of the maintenance cover 6 when the discharge cover 4 and the maintenance cover 6 are both closed.

The image scanning device 1 comprises an anti-fall member 65. The anti-fall member 65 is stored in the discharge cover 4 when the discharge cover 4 is closed. As shown in FIGS. 3, 4, 7, and 8, when the discharge cover 4 is open, the anti-fall member 65 is pivotable from a stored position in which the anti-fall member 65 is directed frontward to an extending position in which the anti-fall member 65 is directed upward.

The anti-fall member 65 comprises an extending portion 66 and a stopper 67. When the anti-fall member 65 is in the extending position, the extending portion 66 extends upward and leftward, and the stopper 67 protrudes upward and rightward. The stopper 67 is configured to contact a postcard discharged along the one-way path 42, and to stop the postcard from falling outside the image scanning device 1.

A feed portion 11 and a discharge portion 12 are disposed in the housing 2 at positions which are exposed when the tray 3 is in the use position.

The feed portion 11 is disposed below the discharge portion 12. An upper surface of the feed portion 11, except for a right end portion, is a flat surface extending in the front-rear direction and in the left-right direction. The right end portion of the upper surface of the feed portion 11 gently curves and inclines upward and rightward so as to protrude downward. The right end portion provides a minute clearance for a lower end of an inner surface of the tray 3 which is in the use position.

The feed portion 11 comprises a pair of sheet-width guides 13 which are opposite to each other in the front-rear direction.

The sheet-width guides 13 are configured to move closer to or away from each other by an equal distance relative to the center therebetween.

As shown in FIG. 3, when the sheet-width guides 13 are closest to each other, a distance therebetween corresponds to the smallest width which is substantially equal to the length of the short side of the European and American business card size. In this state, when a sheet having such a size is inserted between the sheet-width guides 13 from the right, the sheet is placed and center-aligned on the feed portion 11.

As shown in FIG. 1, when the sheet-width guides 13 are most distant from each other, a distance therebetween corresponds to the largest width which is substantially equal to the length of the short side of the legal size. In this state, when a sheet having such a size is inserted between the sheet-width guides 13 from the right, the sheet is placed and center-aligned on the feed portion 11 and the tray 3.

When a sheet having a size greater than the European and American business card size and less than the legal size is placed on the feed portion 11, a distance between the sheet-width guides 13 is adjusted according to the width of the sheet in the front-rear direction.

The discharge portion 12 is disposed above the feed portion 11 while leaving a space therebetween. The discharge portion 12 has a rectangular plate shape which extends in the front-rear direction and in the left-right direction. A sheet is discharged rightward from the inside of the housing 2 onto the discharge portion 12. A right edge portion of the sheet passes the discharge portion 12 and is placed on the tray 3. The left edge portion of the sheet remains on the discharge portion 12. Because the left edge portion of the sheet remains on the discharge portion 12, a part of the sheet does not overlap a sheet placed over the feed portion 11 and the tray 3.

As shown in FIGS. 2, 4, 6, and 8, a common path 14 is defined inside the housing 2. The common path 14 extends leftward from the left end of the feed portion 11, bends to extend obliquely downward and leftward, and further bends to extend leftward.

A feed roller 15, which is an example of a feeding mechanism, a separation roller 16, a first LF roller 17, a driven roller 18, second LF rollers 19, and driven rollers 20, 21, which are part of an example of a conveying mechanism, are disposed along the common path.

The feed roller 15 is disposed at an entrance of the common path 14. The feed roller 15 is rotatable about an axis extending in the front-rear direction.

The separation roller 16 is disposed leftward of the feed roller 15 while leaving a space therebetween. The separation roller 16 is rotatable about an axis extending in the front-rear direction. A separation member 22 is disposed above the separation roller 16. The separation roller 22, which may be made of rubber, is in elastic contact with the periphery of the separation roller 16 from above.

The first LF roller 17 and the driven roller 18 are disposed opposite to each other across a portion of the common path 14 which is inclined downward and leftward. The first LF roller 17 and the driven roller 18 are each rotatable about an axis extending in the front-rear direction. The periphery of the driven roller 18 is in contact with the periphery of the first LF roller 17 from below.

The second LF rollers 19 and the driven rollers 20, 21 are disposed in the vicinity of an exit of the common path 14.

Figure 9:
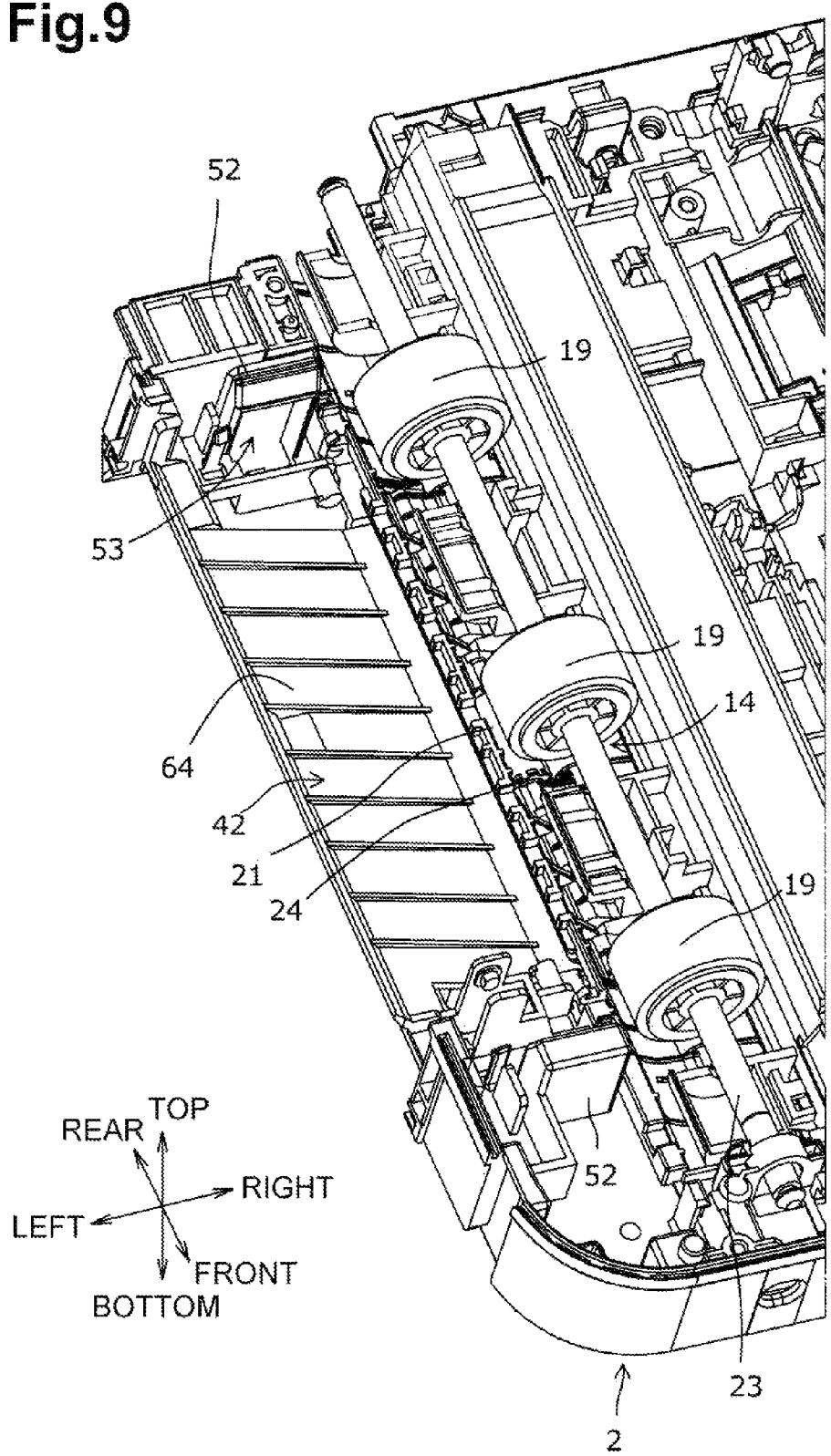
FIG. 9 is a perspective view of a left end portion inside a housing of the image scanning device.

As shown in FIG. 9, the three second LF rollers 19 are disposed in the front-rear direction. The three second LF rollers 19 are disposed at intervals on a common rotary shaft 23 which extends in the front-rear direction. The second LF roller 19 in the middle is disposed at the center in the front-rear direction of the housing 2. Opposite ends of the rotary shaft 23 are rotatably supported by the housing 2. Accordingly, the three second LF rollers 19 are rotatable about the rotary shaft 23.

As shown in the FIGS. 2, 3, 6, and 8, the driven rollers 20 are disposed opposite to the second LF rollers 19 respectively across the common path 14. The driven rollers 20 are rotatable about an axis extending in the front-rear direction. The periphery of each driven roller 20 is in contact with the periphery of a corresponding second LF roller 19 at a position slightly right from the lowest point.

As shown in FIG. 9, the driven roller 21 is disposed opposite to the second LF roller 19 in the middle, across the common path 14. No driven roller 21 is provided for each of the second LF rollers 19 at the front and rear. The driven roller 21 is rotatable about an axis extending in the front-rear direction. The periphery of the driven roller 21 is in contact with the periphery of the second LF roller 19 in the middle at a position slightly left from the lowest point.

The driven roller 21 is disposed opposite to the second LF roller 19 in the middle only because the second LF roller 19 and the driven roller 21 are configured to convey a postcard or the like when the discharge cover 4 is open and when the postcard or the like is conveyed along the one-way path 42, as will be described later.

Figure 10:
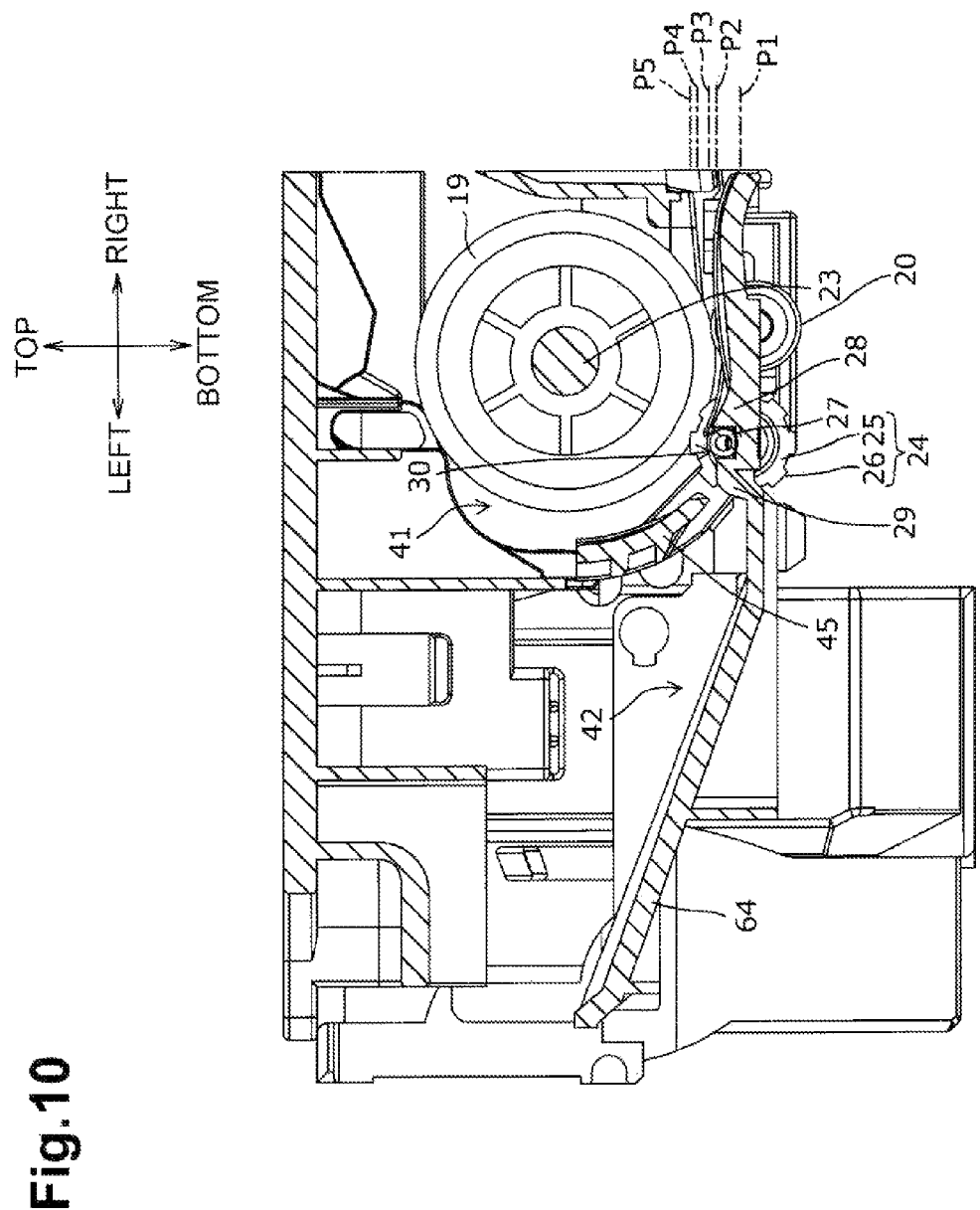
FIG. 10 is a cross-sectional view of a second LF roller and its vicinity of the image scanning device, showing that a flapper extends along a return path.
Figure 11:
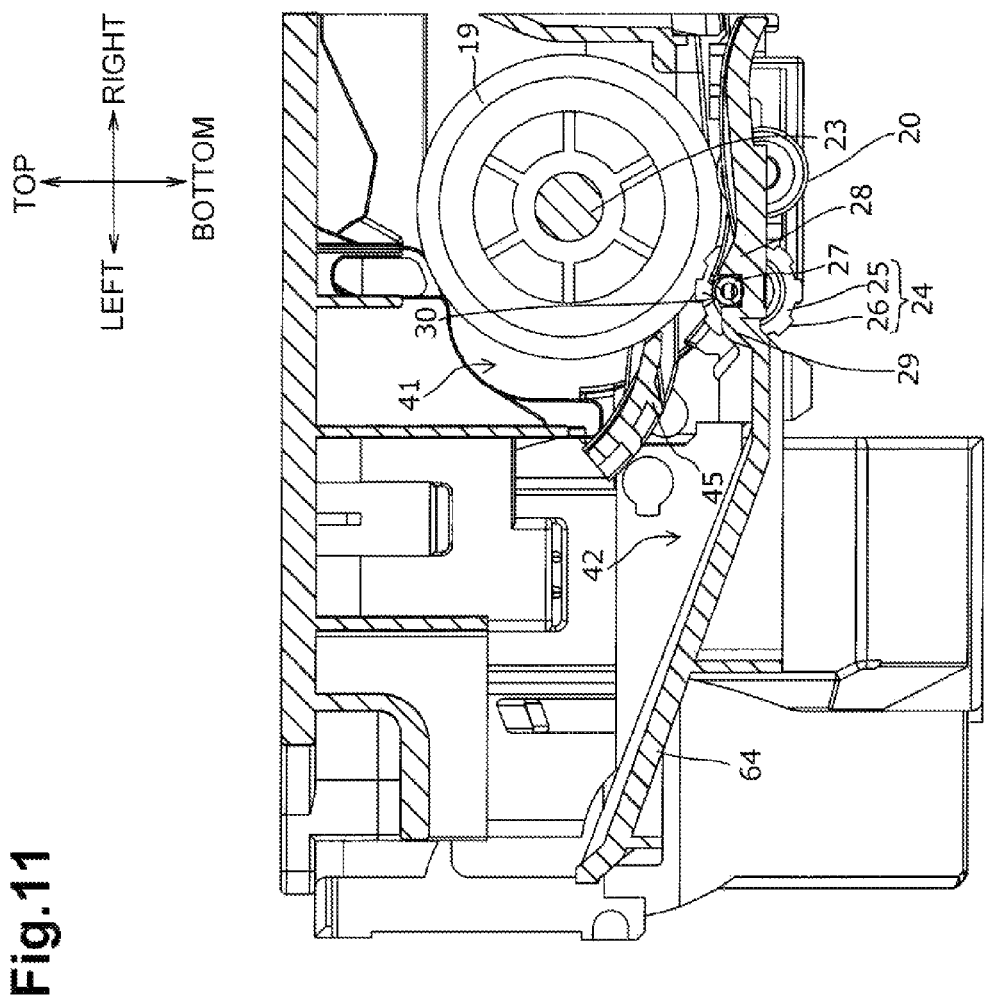
FIG. 11 is a cross-sectional view of a second LF roller and its vicinity of the image scanning device, showing that a flapper extends along a one-way path.

A pushing member 24 is disposed on both sides of the drive roller 21 in the front-rear direction. As shown in FIGS. 10 and 11, the pushing member 24 comprises a disk-shaped main body 25 and a plurality of protrusions 26 which is integrally formed with the main body to protrude radially from the periphery of the main body 25. The rotary shaft 27, which is commonly used for the driven roller 21, is inserted into the center of the main body 25 such that the main body 25 is not rotatable relative to the rotary shaft 27.

As shown in FIGS. 10 and 11, an upstream protrusion 28 and a downstream protrusion 29, which are plate-shaped, are disposed in the vicinity of the exit of the common path 14 on either outer side of the common path 14 in the front-rear direction.

The upstream protrusion 28 is disposed on the right side of the rotary shaft 27 and extends in the left-right direction. The upstream protrusion 28 protrudes upward beyond a lower surface of the common path 14, and has a triangular shape so as to protrude gradually from the right to the left, as viewed from the front. As shown in FIG. 10, the highest position P3 of the upstream protrusion 28 is higher than the axis of the driven roller 21, i.e., an axis position P1 of the rotary shaft 27, and is lower than the highest position P4 of the periphery of the driven roller 21.

The downstream protrusion 29 is disposed on the left side of the rotary shaft 27 and extends in the left-right direction. The downstream protrusion 29 protrudes upward beyond the lower surface of the common path 14. An upper end position P2 of the downstream protrusion 29 is higher than the axis position P1 of the rotary shaft 27 and is lower than the highest position P4 of the periphery of the driven roller 21. A rear end of the downstream protrusion 29 is positioned leftward of the pushing member 24.

A shaft holding portion 30 is formed between the upstream protrusion 28 and the downstream protrusion 29 so as to rotatably hold an end portion of the rotary shaft 27. In this way, the driven roller 21 and the pushing member 24 are rotatably supported on the rotary shaft 27. A distance P1-P5 between the axis of the pushing member 24 and a protruding end of the protrusion 26 of the pushing member 24 is greater than a distance P1-P4 between the axis of the pushing member 24 and the periphery of the driven roller 21.

As shown in FIGS. 2, 4, 6, and 8, between the first LF roller 17 and the second LF roller 19, the common path 14 extends along a first contact glass 31 and a second contact glass 32.

The first contact glass 31 is a thin, rectangular plate elongated in the left-right direction. A width of the first contact glass 31 in the front-rear direction is substantially equal to a width of the common path 14 in the front-rear direction. The common path 14 extends over a left end portion of the first contact glass 31.

A CIS (contact image sensor) module 33 is disposed below the first contact glass 31 movably in the left-right direction. The CIS module 33 comprises therein LED lights, lenses, and an image sensor. Under normal conditions, the CIS module 33 is disposed opposite to the left end portion of the first contact glass 31.

The housing 2 is divided into an upper portion and a lower portion. A rear end of the upper portion of the housing 2 is connected to a rear end of the lower portion of the housing 2 by way of a hinge (not shown). The upper portion of the housing 2 is swingable about the hinge relative to the lower portion. When a front end of the upper portion of the housing 2 is raised, the first contact glass 31 is exposed. The CIS module is configured to scan an image of a document placed on the first contact glass 31.

The second contact glass 32 is opposite to the common path 14 from above. The second contact glass 32 is a thin, rectangular plate elongated in the front-rear direction. A width of the second contact glass 32 in the front-rear direction is substantially equal to the width of the common path 14 in the front-rear direction.

A CIS (contact image sensor) module 34 is disposed above the second contact glass 32 movably in the left-right direction. The CIS module 34 comprises therein LED lights, lenses, and an image sensor.

The return path 41 and the one-way path 42 are defined inside the housing 2.

The return path 41 is defined by a cover-side convey guide 43, which is formed by an inner surface of the maintenance cover 6, the periphery of each second LF roller 19, and an upper surface of a housing-side convey guide 63. The housing-side convey guide 63 has a thin plate shape. The housing-side convey guide 63 extends rightward from a position which leaves a minute clearance on the right side relative to the highest position of the periphery of each second LF roller 19. The right end of the housing-side convey guide 63 is disposed at a position which leaves a minute clearance on the left side relative to the discharge portion 12. The return path 41 curves from the exit of the common path 14 upward along the periphery of each second LF roller 19, and extends rightward from the highest position of the periphery of each second LF roller 19. The exit of the return path 41 is positioned in the vicinity of the left end of the discharge portion 12. A width of the return path 41 in the front-rear direction is substantially equal to the width of the common path 14 in the front-rear direction. The cover-side convey guide 43 and the housing-side convey guide 63 are part of an example of the conveying mechanism.

A driven roller 44 is disposed at the top left of the corresponding second LF roller 19, across the return path 41. The driven roller 44 is rotatable about an axis extending in the front-rear direction. The periphery of the driven roller 44 is in contact with the periphery of the corresponding second LF roller 19 from the top left.

The one-way path 42 extends obliquely upward and leftward from the exit of the common path 14.

Specifically, a convey guide 64 is disposed leftward of the driven roller 21. The convey guide 61 has a thin plate shape. The convey guide 61 extends leftward shortly from the proximity of a central position in the top-bottom direction of the periphery of the driven roller 21, and bends upward and leftward. A left end of the convey guide 64 is disposed in the proximity of a lower end of the discharge cover 4. As shown in FIG. 9, a length of the convey guide 64 in the front-rear direction is slightly smaller than a distance between a rear end face of the front second LF roller 19 and a front end face of the rear second LF roller. The one-way path 42 is defined as a space which extends upward and leftward from a position between a right end of the convey guide 61 and a flapper 45 (to be described later), along an upper surface of the convey guide 64. The flapper 45 and the convey guide 64 are part of an example of the conveying mechanism.

An entrance of the one-way path 42 is opposite to a central portion in the front-rear direction of the exit of the common path 14. A width of the one-way path 41 in the front-rear direction is smaller than the width of the common path 14 in the front-rear direction. An exit of the one-way path 42 is positioned in the proximity of a lower end of the discharge cover 4. An angle θ1 of inclination of the one-way path 42 relative to the horizontal surface HS is smaller than an angle θ3 of inclination of the discharge cover 4, which is open, relative to the horizontal surface HS. The angle θ1 is, for example, 20 degrees.

The flapper 45 is disposed at a junction of the return path 41 and the one-way path 42. The flapper 45 is swingable, about a swing axis extending in the front-rear direction, between a position shown in FIG. 10 and a position shown in FIG. 11. The flapper 45 in the position shown in FIG. 10 extends along the return path 41 such that a lower end thereof closes the one-way path 42. The flapper 45 in the position shown in FIG. 11 extends along the one-way path 42 such that a right end thereof closes the return path 41, thereby allowing the sheet to enter from the common path 14 to the one-way path 42.

The flapper 45 is shifted between the position shown in FIG. 10 and the position shown in FIG. 11 in response to opening and closing of the discharge cover 4. Specifically, as shown in FIGS. 2, 4, 6, and 8, a link mechanism 46 is provided to swing the flapper 45 in response to opening and closing the discharge cover 4. The link mechanism 46 is configured to move the flapper 45 to the position shown in FIG. 10 when the discharge cover 4 is closed, and to move the flapper 45 to the position shown in FIG. 11 when the discharge cover 4 is opened.

Figure 12:
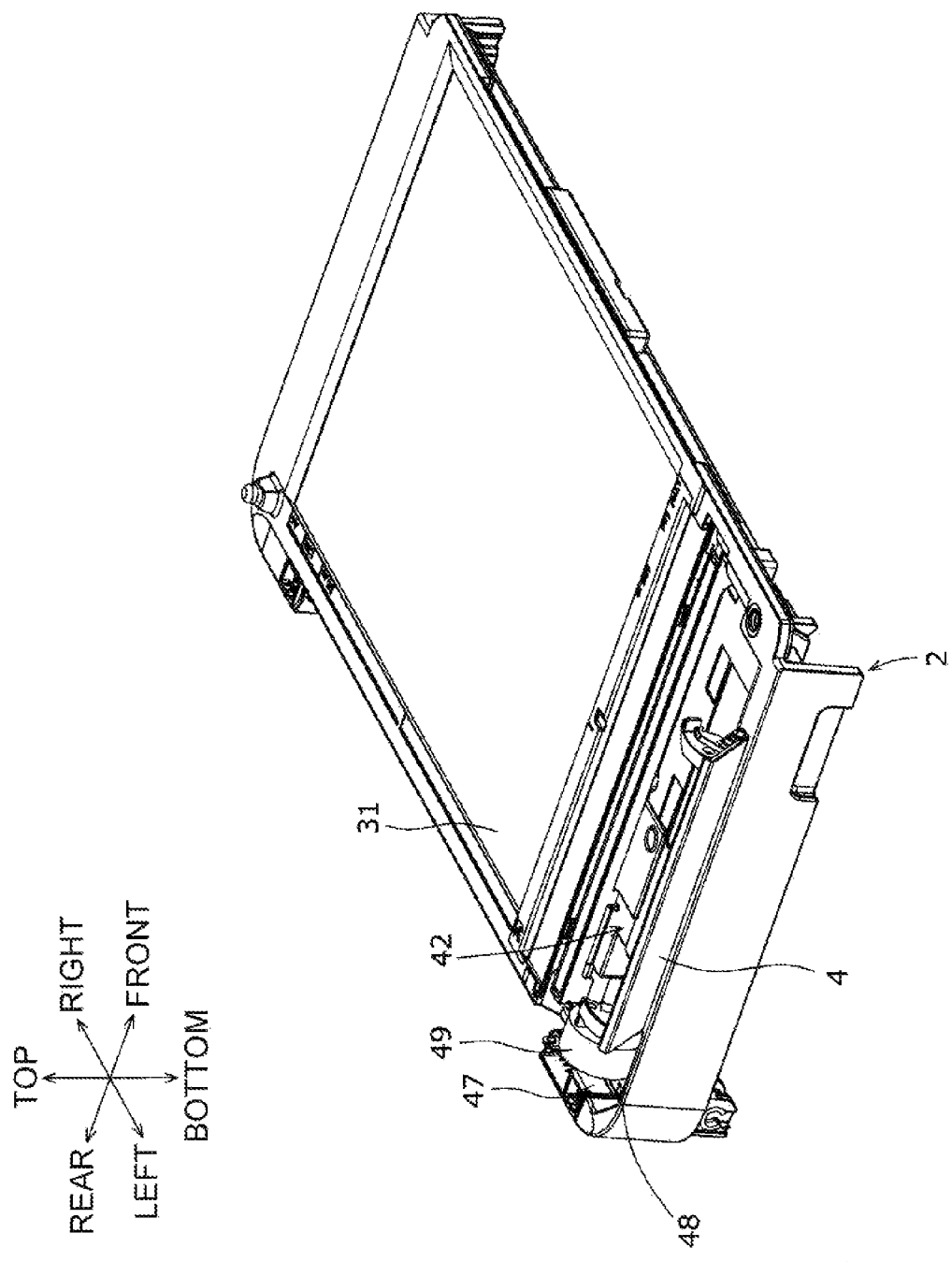
FIG. 12 is a perspective view of a lower portion of the housing of the image scanning device.

As shown in FIG. 12, a space 48 is defined in a left rear corner portion of the housing 2. FIG. 12 shows a state in which the convey guide 64 is removed. Specifically, the space 48 is defined between a rear edge of the convey guide 64 and a rear wall 47, and is not used as the one-way path 42. The space 48 is effectively used to store a motor 49 which drives the feed roller 15, the separation roller 16, the first LF roller 17, and the second LF rollers 17.

As shown in FIGS. 2, 4, 6, and 8, a space 50 is defined below a left end of the one-way path 42 which inclines upward and leftward. The image scanning device 1 swings about a swing axis extending in the left-right direction between a position along the horizontal surface HS and a position in which a front end of the image scanning device 1 is raised relative to the printer (not shown). The space 50 is effectively used to store a support arm 51, which is an example of a stopper for supporting the image scanning device 1 in a state in which the front end thereof is raised relative to the printer.

As shown in FIG. 9, engaged portions 52 stand on opposite sides of the one-way path 42 in the front-rear direction. The engaged portions 52 each have a rectangular parallelepiped shape. A rectangular-shaped recess 53 is formed in an inner surface in the front-rear direction of each engaged portion 52. As shown in FIG. 5, hooked engaging portions 54 are formed in an inner surface of the maintenance cover 6 respectively for the engaged portions 52. When the maintenance cover 6 is closed, a free end portion of each engaging portion 54 fits into the corresponding recess 53, and each engaging portion 54 engages the corresponding engaged portion 52. Consequently, the maintenance cover 6 is maintained closed.

The image scanning device 1 configured, using an ADF (automatic document feeder), to scan images on both sides of the sheet simultaneously, or to scan an image on one side of the sheet selectively. Sheet feeding and image reading will be explained below in a time sequence.

When, for example, A4-size sheets are used, the discharge cover 4 is closed. As shown in FIG. 1, a distance between the side width guides 13 is adjusted roughly to a length of the short side of the A4-size sheet while the tray 3 is open relative to the housing 2. Then the sheets are inserted between the sheet width guides 13 from the right. The distance between the side width guides 13 is adjusted to a length in the front-rear direction of the inserted sheets. In this way, the sheets are placed on the feed portion 11 and the tray 3.

Leading edges of the sheets are positioned on the periphery of the feed roller 15. When the feed roller 15 rotates counter-clockwise as viewed from the front, the lowermost sheet is fed into the common path 14 by a friction force generated between a lower surface of the lowermost sheet and the periphery of the feed roller 15.

The separation roller 16 rotates counterclockwise as viewed from the front. When the leading edge of the sheet contacts a contact portion between the periphery of the separation roller 16 and the separation member 22, the rotation of the separation roller 16 causes the sheet to enter between the periphery of the separation roller 16 and the separation member 22. The sheet is properly separated one by one by a friction force applied to the sheet from the periphery of the separation roller 16 and the separation member 22. The sheet passes between the periphery of the separation roller 16 and the separation member 22.

The first LF roller 17 rotates clockwise as viewed from the front. The rotation of the first LF roller 17 causes the driven roller 18 to rotate counterclockwise as viewed from the front. When the leading edge of the sheet contacts a contact potion between the periphery of the first LF roller 17 and the periphery of the driven roller 18, the rotation of the first LF roller 17 causes the leading edge of the sheet to enter between the periphery of the first LF roller 17 and the periphery of the driven roller 18. The first LF roller 17 applies a conveying force to the sheet.

When the sheet is conveyed further, a lower surface of the sheet faces the first contact glass 31. The CIS module 33 irradiates the lower surface of the sheet on the first contact glass 31. The image sensor of the CIS module 33 receives reflected light from the lower surface of the sheet, thereby to scan an image on the lower surface of the sheet.

On the other hand, an upper surface of the sheet faces the second contact glass 32. The CIS module 34 irradiates the upper surface of the sheet below the second contact glass 32. The image sensor of the CIS module 34 receives reflected light from the upper surface of the sheet, thereby to scan an image on the upper surface of the sheet.

Then the leading edge of the sheet contacts contact portions between the peripheries of the second LF rollers 19 and the peripheries of the driven rollers 20. The second LF rollers 19 rotate clockwise as viewed from the front. The rotation of each second LF roller 19 causes the corresponding driven roller 20 to rotate counterclockwise as viewed from the front. This causes the leading edge of the sheet to enter between the peripheries of the second LF rollers 19 and the peripheries of driven rollers 20. The second LF rollers 19 apply a conveying force to the sheet.

Then the leading edge of the sheet contacts a contact portion between the periphery of the second LF roller 19 and the periphery of the driven roller 21. The rotation of the second LF roller 19 causes the driven roller 21 to rotate counterclockwise as viewed from the front. This causes the leading edge of the sheet to enter between the periphery of the second LF roller 19 and the periphery of the driven roller 21. The second LF roller 19 applies a conveying force to the sheet.

At this time, because the discharge cover 4 is closed, the flapper 45 is in the position shown in FIG. 10. The sheet conveyed from the periphery of the second LF roller 19 and the periphery of the driven roller 21 is conveyed in the return path 41 while the leading edge of the sheet moves along the flapper 45.

The sheet conveyed in the return path 41 moves toward a contact portion between the periphery of the second LF roller 19 and the periphery of the driven roller 44. The rotation of the second LF roller 19 causes the driven roller 44 to rotate counterclockwise as viewed from the front. When the leading edge of the sheet contacts a contact portion between the periphery of the second LF roller 19 and the periphery of the driven roller 44, the leading edge of the sheet enters between the periphery of the second LF roller 19 and the periphery of the driven roller 44. The second LF roller 19 applies a conveying force to the sheet.

Then when a trailing edge of the sheet leaves the contact portion between the periphery of the second LF roller 19 and the periphery of the driven roller 44, the sheet is discharged onto the discharge portion 12 and the tray 3 and extends thereover.

When, for example, a relatively rigid sheet such as a postcard is used, the discharge cover 4 is opened. As shown in FIG. 1, a distance between the side width guides 13 is adjusted roughly to a length of the short side of the sheet while the tray 3 is open relative to the housing 2. Then the sheet is inserted between the sheet width guides 13 from the right. The distance between the side width guides 13 is adjusted to a length in the front-rear direction of the inserted sheet. In this way, the sheet such as a postcard is placed on the feed portion 11.

A leading edge of the sheet is positioned on the periphery of the feed roller 15. When the feed roller 15 rotates counter-clockwise as viewed from the front, the sheet is fed into the common path 14 by a friction force generated between a lower surface of the sheet and the periphery of the feed roller 15.

The separation roller 16 rotates counterclockwise as viewed from the front. When the leading edge of the sheet contacts a contact portion between the periphery of the separation roller 16 and the separation member 22, the rotation of the separation roller 16 causes the sheet to enter between the periphery of the separation roller 16 and the separation member 22. The sheet passes between the periphery of the separation roller 16 and the separation member 22.

The first LF roller 17 rotates clockwise as viewed from the front. The rotation of the first LF roller 17 causes the driven roller 18 to rotate counterclockwise as viewed from the front. When the leading edge of the sheet contacts a contact potion between the periphery of the first LF roller 17 and the periphery of the driven roller 18, the rotation of the first LF roller 17 causes the leading edge of the sheet to enter between the periphery of the first LF roller 17 and the periphery of the driven roller 18. The first LF roller 17 applies a conveying force to the sheet.

When the sheet is conveyed further, a lower surface of the sheet faces the first contact glass 31. The CIS module 33 irradiates the lower surface of the sheet on the first contact glass 31. The image sensor of the CIS module 33 receives reflected light from the lower surface of the sheet, thereby to scan an image on the lower surface of the sheet.

On the other hand, an upper surface of the sheet faces the second contact glass 32. The CIS module 34 irradiates the upper surface of the sheet below the second contact glass 32. The image sensor of the CIS module 34 receives reflected light from the upper surface of the sheet, thereby to scan an image on the upper surface of the sheet.

Then the leading edge of the sheet contacts contact portions between the peripheries of the second LF rollers 19 and the peripheries of the driven rollers 20. The second LF rollers 19 rotate clockwise as viewed from the front. The rotation of each second LF roller 19 causes the corresponding driven roller 20 to rotate counterclockwise as viewed from the front. This causes the leading edge of the sheet to enter between the peripheries of the second LF rollers 19 and the peripheries of driven rollers 20. The second LF rollers 19 apply a conveying force to the sheet.

Then the leading edge of the sheet contacts a contact portion between the periphery of the second LF roller 19 and the periphery of the driven roller 21. The rotation of the second LF roller 19 causes the driven roller 21 to rotate counterclockwise as viewed from the front. This causes the leading edge of the sheet to enter between the periphery of the second LF roller 19 and the periphery of the driven roller 21. The second LF roller 19 applies a conveying force to the sheet.

At this time, because the discharge cover 4 is open, the flapper 45 is in the position shown in FIG. 11. The flapper 45 allows the sheet to enter from the common path 14 to the one-way path 42. The sheet conveyed from the periphery of the second LF roller 19 and the periphery of the driven roller 21 is conveyed along the one-way path 42.

Then when a trailing edge of the sheet leaves the contact portion between the periphery of the second LF roller 19 and the periphery of the driven roller 21, the sheet is discharged such that the leading edge thereof is positioned on the discharge cover 4.

At this time, because the sheet is relatively rigid, the leading edge of the sheet may contact the discharge cover 4 or an upper surface of the one-way path 42, and the trailing edge of the sheet may remain on the periphery of the driven roller 21. In this case, the protrusions 26 of the pushing members 24, which rotate together with the driven roller 21, contact and push leftward the trailing edge of the sheet. Consequently, the trailing edge of the sheet falls off the periphery of the driven roller 21, and the sheet is discharged completely.

The sheet is conveyed leftward along the common path 14. The sheet conveyed leftward from the common path 14 to the return path 41 is turned around rightward along the return path 41. The sheet conveyed from the common path 14 to the one-way path 42 is discharged leftward along the one-way path 42. The sheet discharged from the one-way path 42 is received by the discharge cover 4. At this time, the discharge cover 4 is open and is in an inclined position in which the cover extends upward from the one-way path 42 and is inclined relative to the one-way path 42. This reduces the area occupied by the discharge cover 4, as viewed from the top, when the discharge cover 4 receives the sheet.

Accordingly, the sheet can be selectively discharged onto the discharge portion 12 and the discharge tray 4 without increasing the area occupied by the image scanning device 1, i.e., the size in the plan view of the image scanning device 1.

The discharge cover 4 extends obliquely upward and leftward at the angle θ3 of substantially 50 degrees relative to the horizontal surface HS. Thus, the sheet received by the discharge cover 4 can be readily taken out therefrom.

The discharge cover 4 is opened and closed by being pivoted about the pivot shaft 61 which extends in the front-rear direction. When the discharge cover 4 is closed, an outer surface of the discharge cover 4 forms a central part in the front-rear direction of the left side surface of the housing 2. Thus, when the discharge cover 4 is closed, no extra area is occupied by the discharge cover 4. Consequently, the area occupied by the image scanning device 1 can be reduced further.

The one-way path 42 is inclined upward and leftward relative to the horizontal surface HS at the angle θ1 of approximately 20 degrees. The angle θ3 of inclination of the discharge cover 4 in the open position is approximately 50 degrees. Thus, the discharge cover 4 in the open position is inclined at the angle θ2 of approximately 30 degrees relative to the one-way path 42. Such inclinations of the one-way path 42 and the discharge cover 4 allow the sheet to move smoothly from the common path 14, via the one-way path, onto the discharge cover 4.

As shown in FIGS. 2, 4, 6, and 8, the space 50 is defined below the left end of the one-way path 42 which is inclined upward and leftward. The image scanning device 1 is swingable, about the swing axis extending in the left-right direction, between the position along the horizontal surface HS and the position in which the front end of the image scanning device 1 is raised relative to the printer (not shown). The space 50 stores therein the support arm 51 for supporting the image scanning device 1 raised relative to the printer. Because the space 50 is effectively used, the image scanning device 1 can be reduced further in size.

Although, in the above-described embodiment, the angle θ1 of inclination of the one-way path 42 relative to the horizontal surface HS is approximately 20 degrees, and the angle θ2 of inclination, relative to the one-way path 42, of the discharge cover 4 in the open position is approximately 30 degrees, these angles are not limited to those described in the above-described embodiment. However, it is preferable that the angle θ1 is less than 45 degrees, the angle θ2 is less than 45 degrees, and the angle θ2 is greater than the angle θ1.

Although in the above-described embodiment, the discharge cover 4 in the open position is inclined at the angle θ2 of approximately 30 degrees relative to the one-way path 42. Thus, the angle of inclination, relative to the horizontal surface HS, of the path extending from the one-way path 42 to the discharge cover 4 changes in two steps. Instead, the one-way path may bend such that the angle of inclination, relative to the horizontal surface HS, of the path extending from the one-way path 42 to the discharge cover 4 changes in three or more steps.

The discharge cover 41 may be held in two or more positions, e.g., in the closed position shown in FIGS. 1 and 2, in the open position shown in FIGS. 3 and 4, and in a position therebetween. This allows for adjustment of the position of the discharge cover 4, i.e., the angle of inclination of the discharge cover 4 relative to the horizontal surface HS, according to the degree of rigidity of the sheet for discharging the sheet properly onto the discharge cover 4.

Figure 13A:
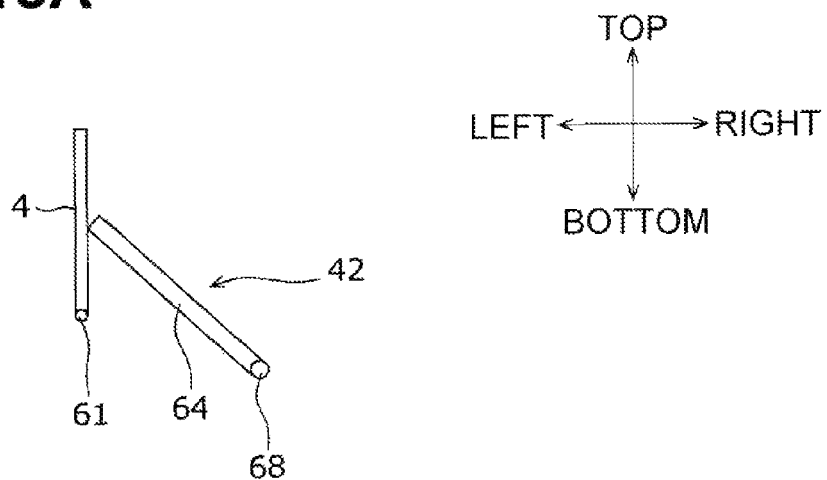
FIG. 13A is a diagram illustrating the discharge cover which is closed and moves together with the one-way path in the housing.
Figure 13B:
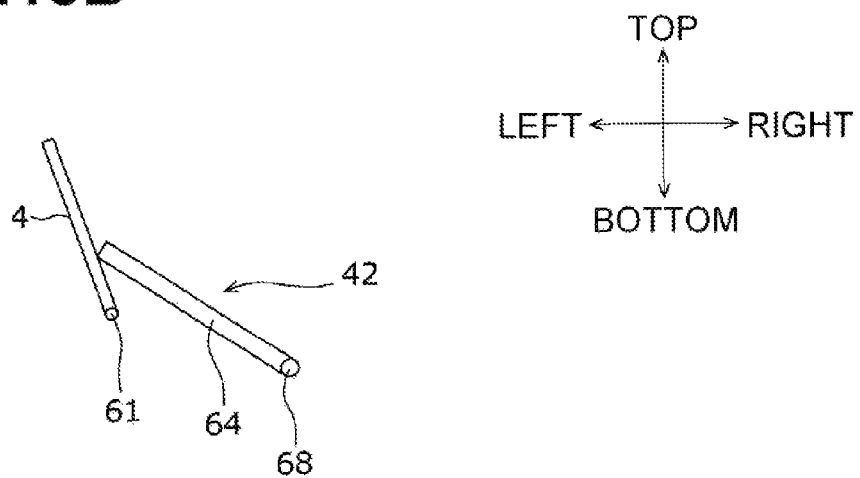
FIG. 13B is a diagram illustrating the discharge cover which is open and moves together with the one-way path in the housing.

As illustrated in FIGS. 13A and 13B, the one-way path 42 may swing in response to the pivot of the discharge cover 4. For example, as shown in FIGS. 13A and 13B, a rotary shaft 68 may be provided at a right end of the convey guide 64 which defines the one-way path 42. The convey guide 64 may be swingably supported by the rotary shaft 68. As shown in FIG. 13A, when the discharge cover 4 is closed, the convey guide 64 may be in a position inclined upward and leftward at a relatively large angle relative to the horizontal surface HS. As shown in FIG. 13B, when the discharge cover 4 is open, a left end of the convey guide 64 may move down about the rotary shaft 68 due to its own weight into a position inclined upward and leftward at a relatively small angle relative to the horizontal surface HS.

The one-way path 42, which swings in response to the pivot of the discharge cover 4 so as to be substantially parallel to the discharge cover 4, can reduce the distance between the one-way path 42 and the discharge cover 4. Thus, the device can be reduced in size.

Figure 14:
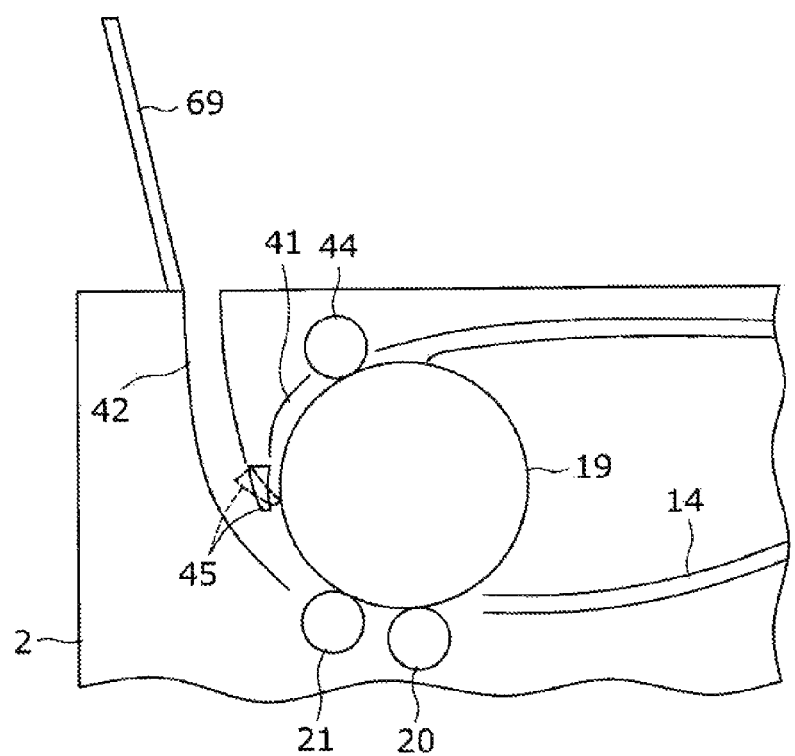
FIG. 14 is a cross-sectional view illustrating the one-way path which extends from a junction of the one-way path and the return path.

As illustrated in FIG. 14, the one-way path 42 may extend upward from the junction of the one-way path 42 and the return path 41. For example, a discharge tray 69 may be provided so as to extend upward and leftward and to receive the sheet discharged from the one-way path 42.

Although postcards are taken as an example of relatively rigid sheets in the above-described embodiment, business cards, credit cards, or the like may be conveyed instead. Although relatively rigid sheets are taken as an example of sheets conveyed along the one-way path 42 in the above-described embodiment, relatively flexible sheets, e.g., sales receipts may be conveyed instead.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image scanning device comprising:
   a housing;
   an image sensor disposed inside the housing and configured to scan, at a scanning position, an image of a sheet;
   a conveying mechanism disposed inside the housing and configured to convey the sheet along a common path to the scanning position in a first direction, and to discharge the sheet having passed the scanning position selectively along a return path in a second direction and along a one-way path in the first direction, the conveying mechanism comprising:
   a flapper configured to be moved between a first position to partially define the return path and a second position to partially define the one-way path; and
   a convey guide inclined upward at a first angle relative to a horizontal surface and partially defining the one-way path;
   a cover configured to move between a closed position and an open position relative to the housing; and
   a linking mechanism configured to move the flapper between the first position and the second position in response to movement of the cover between the closed position and the open position,
   wherein the conveying mechanism is configured such that a dimension of the one-way path in a width direction which is perpendicular to a vertical direction and the first direction is less than a dimension of the common path in the width direction, and
   wherein the conveying mechanism, the cover and the linking mechanism are configured such that:
   when the cover is in the open position, the convey guide and the flapper in the second position guide, along the one-way path, the sheet having passed the scanning position to the cover which is inclined upward relative to the horizontal surface at a second angle, the second angle being greater than the first angle at which the convey guide is inclined, and
   when the cover is in the closed position, the flapper in the first position guides, along the return path, the sheet having passed the scanning position, and the cover is inclined upward relative to the horizontal surface at a third angle which is greater than the second angle.

2. The image scanning device according to claim 1, wherein the second direction is opposite to the first direction.

3. The image scanning device according to claim 1, wherein the cover is configured to pivot about a pivot axis extending in a width direction which is perpendicular to a vertical direction and the first direction.

4. The image scanning device according to claim 3, wherein when the cover is in the closed position, an outer surface of the cover is flush with an outer surface of the housing.

5. The image scanning device according to claim 3, wherein the cover is configured to be held by the housing in a plurality of positions including the closed position and the open position.

6. The image scanning device according to claim 1, wherein the convey guide of the conveying mechanism is configured to swing in response to pivoting of the cover.

7. The image scanning device according to claim 1,
   wherein the convey guide of the conveying mechanism is inclined at the first angle of less than 45 degrees relative to the horizontal surface, and
   wherein the cover in the open position is inclined relative to the convey guide at a fourth angle of less than 45 degrees.

8. The image scanning device according to claim 1,
   wherein the housing is configured to swing, about a swing axis parallel to the first direction, between a position along the horizontal surface and an inclined position relative to the horizontal surface, and
   wherein a stopper for holding the housing in the inclined position is disposed below the convey guide.

9. The image scanning device according to claim 1, further comprising:
   a tray configured to hold a stack of sheets; and
   a feeding mechanism configured to feed sheets to the common path sequentially starting from the sheet at a lowermost position in the stack.

10. The image scanning device according to claim 1, further comprising an anti-fall member including an extending portion and a stopper, the anti-fall member configured to pivot to an extending position in which an extending portion extends upward from the cover and the stopper protrudes from the extending portion and is configured to contact the sheet received by the cover discharged from the one-way path.

* * * * *